(No Model.)
E. H. OLDS.
RIM FOR VEHICLE WHEELS.
No. 545,375. Patented Aug. 27, 1895.
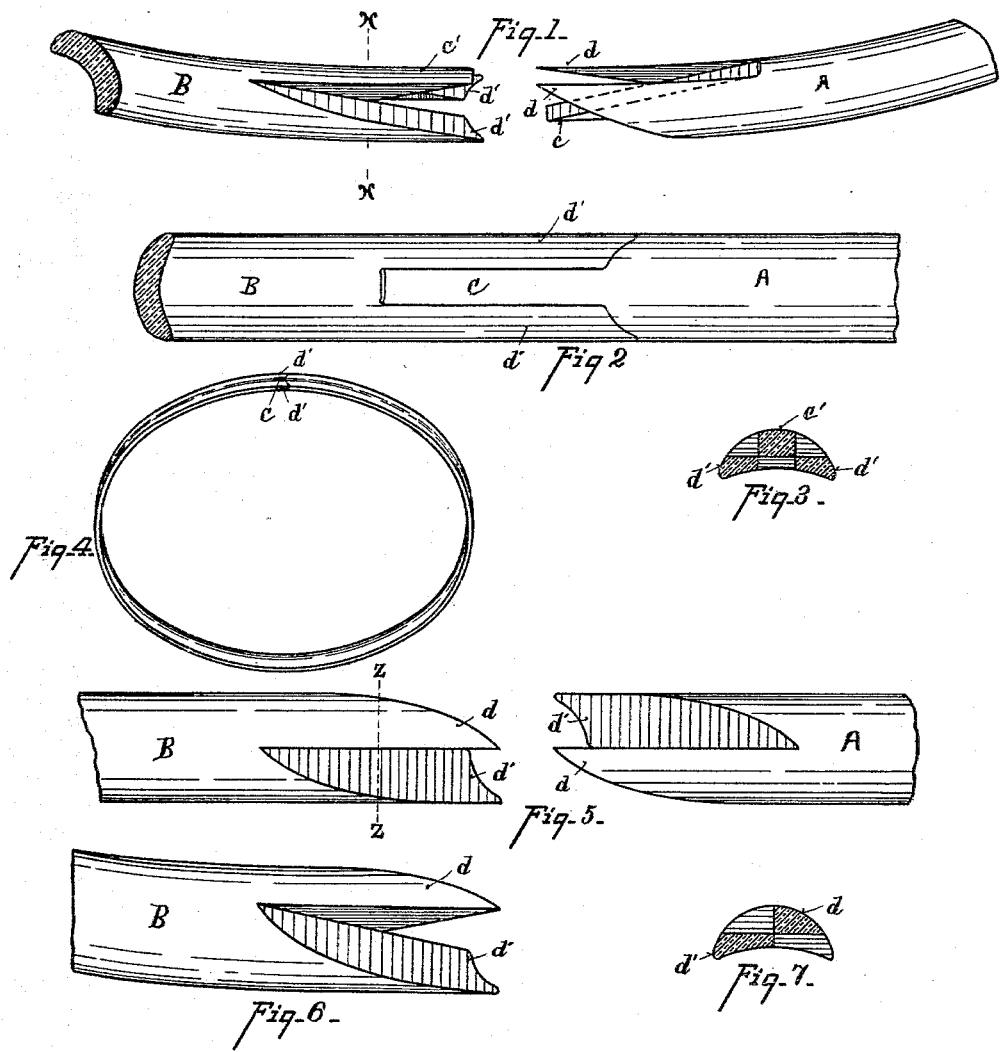
Witnesses
C. W. Miles
Oliver B. Kaiser
Inventor
Eugene H. Olds
By Wood & Bond
Attorney

UNITED STATES PATENT OFFICE.

EUGENE H. OLDS, OF FORT WAYNE, INDIANA.

RIM FOR VEHICLE-WHEELS.

SPECIFICATION forming part of Letters Patent No. 545,375, dated August 27, 1895.

Application filed July 18, 1894. Serial No. 517,923. (No model.)

*To all whom it may concern:*

Be it known that I, EUGENE H. OLDS, a citizen of the United States, residing at Fort Wayne, in the county of Allen and State of Indiana, have invented certain new and useful Improvements in Vehicle - Wheels, of which the following is a specification.

My invention relates to improvements in the manner of uniting the ends of the rims of wheels adapted for velocipedes or other light carriages; and the object of my improvement is to provide a joint self-supporting in every direction in which strain is exerted in the use of such wheels.

The features of my invention by which I attain these objects are fully set forth in the description of the accompanying drawings, making a part of this specification, in which—

Figure 1 is a perspective inside view of the disunited ends of a rim containing my invention. Fig. 2 is an outside plan view of the same as they appear when united. Fig. 3 is a cross-section on the line $x$ $x$, Fig. 1. Fig. 4 is a perspective view of the rim thus formed. Fig. 5 is an inside plan view of the disunited ends of a rim containing my invention in another form. Fig. 6 is a perspective view of the inside of one of these parts. Fig. 7 is a cross-section on the line $z$ $z$, Fig. 5.

I have shown the outer side of the rim concaved for the reception of a cushioned or tubular tire, but the improvement is equally well adapted for any other form.

I have shown two forms of my invention, and will first describe that illustrated in Figs. 1, 2, 3, and 4.

A B represent end sections of a rim-piece, the abutting ends of each being provided with three interlocking tongues.

$c$ represents a center tongue projecting from the outer face of the end A on the line of the circle of the periphery of the rim, and is beveled on its inner side from its base to its end.

$d$ $d$ represent two tongues, one at each side of $c$, and these are beveled on their outer sides from their bases to their ends. The three tongues $c'$ $d'$ $d'$ on the end B are formed in precisely the same way, except that they are respectively beveled in an opposite direction and that $c'$ projects on the line of the inner circle of the rim.

In the form illustrated in Figs. 5, 6, and 7, I have shown each end of the rim provided with two tongues, one of which, $d$, is beveled on the outside, and the other $d'$ on the inside. When thus formed the ends readily interlock and form a very safe, strong joint, which is self-supporting in every direction in which strain is exerted in ordinary use, and cannot be separated except by a direct pull lengthwise.

I prefer the rim to be formed of a single piece, but two or more may be employed and united as above described.

What I claim as my invention, and desire to secure by Letters Patent, is—

1. A rim joint for a wheel, having the meeting ends of the rim-piece formed with diverging, elongated, beveled and pointed tongues and correspondingly shaped grooves, the tongues of one rim-piece lying opposite and interlocking with the grooves of the other rim-piece, substantially as shown and described.

2. A rim-piece for a vehicle-wheel having its ends formed with forked interlocking tongues having opposing tapering bevels throughout their entire length, substantially as shown and described.

In testimony whereof I have hereunto set my hand.

EUGENE H. OLDS.

Witnesses:
J. A. SHEPARD,
O. H. BROOKS.